(12) United States Patent
Choi

(10) Patent No.: US 8,102,488 B2
(45) Date of Patent: Jan. 24, 2012

(54) ARRAY SUBSTRATE AND LIQUID CRYSTAL DISPLAY COMPRISING THE SAME

(75) Inventor: Hyun Sic Choi, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 627 days.

(21) Appl. No.: 12/272,950

(22) Filed: Nov. 18, 2008

(65) Prior Publication Data

US 2009/0225259 A1 Sep. 10, 2009

(30) Foreign Application Priority Data

Mar. 7, 2008 (CN) .......................... 2008 1 0101547

(51) Int. Cl.
*G06F 1/1333* (2006.01)
*G06F 1/1335* (2006.01)

(52) U.S. Cl. ........................... 349/95; 349/110; 349/160

(58) Field of Classification Search .................... 349/15, 349/95, 110, 111, 160
See application file for complete search history.

(56) References Cited

U.S. PATENT DOCUMENTS

| 5,808,712 A * | 9/1998 | Hishida et al. ................. 349/95 |
| 6,147,737 A * | 11/2000 | Yachi ............................ 349/122 |
| 2004/0125263 A1 | 7/2004 | Lee |
| 2008/0123007 A1 | 5/2008 | Cui et al. |

FOREIGN PATENT DOCUMENTS

| CN | 1963645 A | 5/2007 |
| JP | 2006-309019 A | 11/2006 |
| JP | 2007-304351 A | 11/2007 |
| KR | 10-0727265 B1 | 6/2007 |
| KR | 10-0735200 B1 | 7/2007 |

* cited by examiner

*Primary Examiner* — Mark Robinson
*Assistant Examiner* — Michael Inadomi
(74) *Attorney, Agent, or Firm* — Ladas & Parry LLP

(57) ABSTRACT

A liquid crystal display comprising a liquid crystal panel that is formed by attaching a color filter substrate to an array substrate with a liquid crystal layer therebetween. The array substrate comprising a base substrate and a pixel electrode, a signal line, and a light-blocking strip, provided on the base substrate. The light-blocking strip is disposed below and at a side of the signal line and is separated from the signal line by the base substrate, a refractive strip is disposed at the side of the signal line over a gap between the light-blocking strip and the signal line, and the refractive strip is disposed on the same layer as the pixel electrode. The refractive strip deflects light transmitting therethrough from the base substrate side into the liquid crystal layer towards the signal line.

20 Claims, 5 Drawing Sheets

ARRAY SUBSTRATE AND LIQUID CRYSTAL DISPLAY COMPRISING THE SAME

BACKGROUND OF THE INVENTION

The present invention relates to an array substrate and a liquid crystal display (LCD) comprising the same.

LCDs are a common type of flat panel displays, an example of which is thin film transistor-liquid crystal display (TFT-LCDs). TFT-LCDs generally have a structure as shown in FIG. 1 and comprise a backlight unit (BLU) 10, an optical film 20, and a liquid crystal panel 30 disposed in the order from bottom to top, and the liquid crystal panel 30 is typically formed by attaching a color filter (CF) substrate 31 to an array substrate 32 with a liquid crystal layer (not shown) provided therebetween. The TFT-LCD can further comprise a mold frame disposed at sides of the backlight unit 10, the optical film 20 and the panel 30 for supporting and fixing them, including an outer frame 40 disposed most outside. In general, the backlight unit 10 may include a light guide plate 11, a back light source 12, a back plate 13 and so on. The optical film 20 may comprise, for example, a diffusion film, a prism film, and the like, so as to control light emitted from the light guide plate 11 to the liquid crystal panel 30. The various optical films may be collectively referred to as the optical film 20.

The array substrate 32 of the panel 30 generally includes an array of pixels arranged in a matrix form, as shown in FIG. 2, which is a schematically partial top view of the array substrate 32. Each pixel includes a pixel electrode (ITO) 322 and a gate line 321 and a data line 323 that are disposed at sides of the pixel electrode 322 and perpendicular to each other. The pixel electrode 322 is connected to the gate line 321 and the data line 323 via for example, a thin film transistor (TFT) switch element 325. A light-blocking strip 324 is provided in a gap between the data line 323 and the pixel electrode 322 to block light emitted thereto from the backlight unit 10. FIG. 3 is a cross-sectional view of the array substrate 32 taken along line A-A in FIG. 2 together with the color filter substrate 31 provided above the array substrate 32. The array substrate includes a base substrate 326 with the light-blocking strip 324, the data line 323 and the pixel electrode 322 disposed thereon. An insulating layer may be formed between the data line 323, the light-blocking strip 324 and other elements so as to prevent them from being electrically connected with each other. The liquid crystal layer 33 is injected into the space between the color filter substrate 31 and the array substrate 32. As shown in FIG. 3, a black matrix 311 is disposed at the inner side of the color filter substrate 31 for sheltering functional elements on the array substrate 32 other than the pixel electrode 322, and these functional elements comprise the data line 323, the light-blocking strip 324, and the like.

In operation, light emitted from the backlight unit may pass through the gap between the light-blocking strip 324 and the data line 323, as shown in FIG. 3. Light passing through the gap includes a portion that is illuminated perpendicular to the array substrate 32 and a portion that is illuminated obliquely at an acute angle relative to the array substrate 32. When passing through the base substrate 326 of the array substrate 32 and the liquid crystal layer 33, the obliquely illuminated light may be deflected due to refraction due to the refractive index difference between respective materials. The base substrate 326 is typically formed of glass, of which the refractive index is 1.5, assuming that the refractive index of air is 1. Refractive index of the liquid crystal layer depends on liquid crystal molecules contained therein and is approximately in a range of 1.4-1.6. The emission angle of the light substantially remains unchanged after passing through the base substrate 326 and the liquid crystal layer 33. One reason for the leakage light is that a distorted electric field is generated between the pixel electrode on the color filter substrate and the pixel electrode and date line on the array substrate such that liquid crystal molecules are aligned irregularly, causing an abnormal display. Most of the light leaking out may be blocked by the black matrix 311 arranged on the color filter substrate 31. However, there is a problem when the liquid crystal display is impacted by an external force, the panel 30 may become concave downwardly, as shown in FIG. 4. In this case, the black matrix 311 provided in place for blocking light may shift with respect to the array substrate by a distance of d2 and an shift region is formed, as shown in FIG. 5. Thus, light passing through the gap between the light-blocking strip 324 and the data line 323 may further leak out through the shift region. Then, a phenomenon called touch mura occurs. The touch mura is more obvious when more light leaks out through the shift region.

A method has been proposed to prevent the leakage light and touch mura by increasing the area of the black matrix disposed on the color filter substrate such that even when the black matrix shifts by a distance, light passing through the gap between light-blocking strip and the data line can be till blocked. The method, however, brings about another problem, that is, increasing the area of the black matrix reduces the area of transmissive region, giving rise to a reduced aperture ratio and a degraded display quality.

SUMMARY OF THE INVENTION

An embodiment of the invention provides an array substrate adapted for use with a liquid crystal layer, comprising a base substrate and a pixel electrode, a signal line, and a light-blocking strip, provided on the base substrate. The light-blocking strip is disposed below and at a side of the signal line and is separated from the signal line by the base substrate, a refractive strip is disposed at the side of the signal line over a gap between the light-blocking strip and the signal line, and the refractive strip is disposed on the same layer as the pixel electrode. The refractive strip deflects light transmitting therethrough from the base substrate side into the liquid crystal layer towards the signal line.

Another embodiment of the invention provides a liquid crystal display comprising a liquid crystal panel that is formed by attaching a color filter substrate to an array substrate with a liquid crystal layer therebetween. The array substrate comprising a base substrate and a pixel electrode, a signal line, and a light-blocking strip, provided on the base substrate. The light-blocking strip is disposed below and at a side of the signal line and is separated from the signal line by the base substrate, a refractive strip is disposed at the side of the signal line over a gap between the light-blocking strip and the signal line, and the refractive strip is disposed on the same layer as the pixel electrode. The refractive strip deflects light transmitting therethrough from the base substrate side into the liquid crystal layer towards the signal line.

In the embodiments of the present invention, the travel direction of light from a gap between the light-blocking strip and the signal line can be changed by providing a refractive strip over the gap. Specifically, the light is deflected towards the signal line by the refractive strip. When the liquid crystal panel is bent by an external force, although the black matrix may shift by a certain distance, the light passing through the shift region can be substantially reduced, thereby reducing the leakage light. The touch mura effect observed by a user can be reduced accordingly, and the display quality can be improved. Meanwhile, as compared with the conventional panel, the aperture ratio of the liquid crystal display is not reduced, and transmissivity or brightness is not disadvantageously affected.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION OF THE PREFERRED EMBODIMENTS

A first embodiment of an array substrate according to the invention is described in the following.

Figure 1:
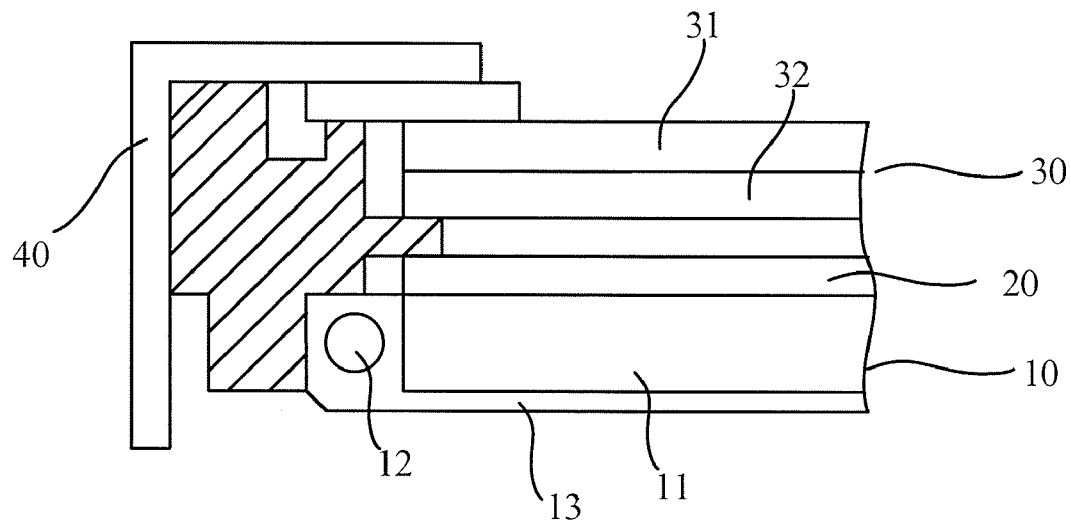
FIG. 1 is a schematic structural view showing a conventional liquid crystal display.
Figure 2:
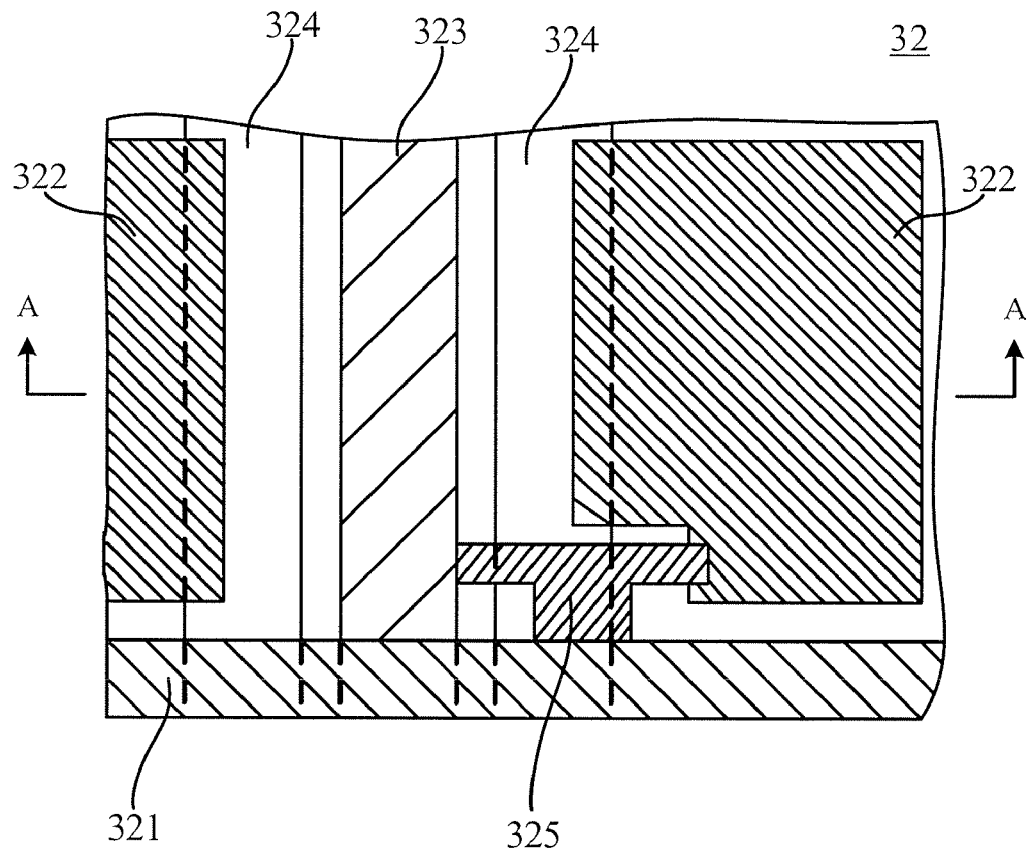
FIG. 2 is a schematic top view showing a part of an array substrate in a conventional liquid crystal display.
Figure 3:
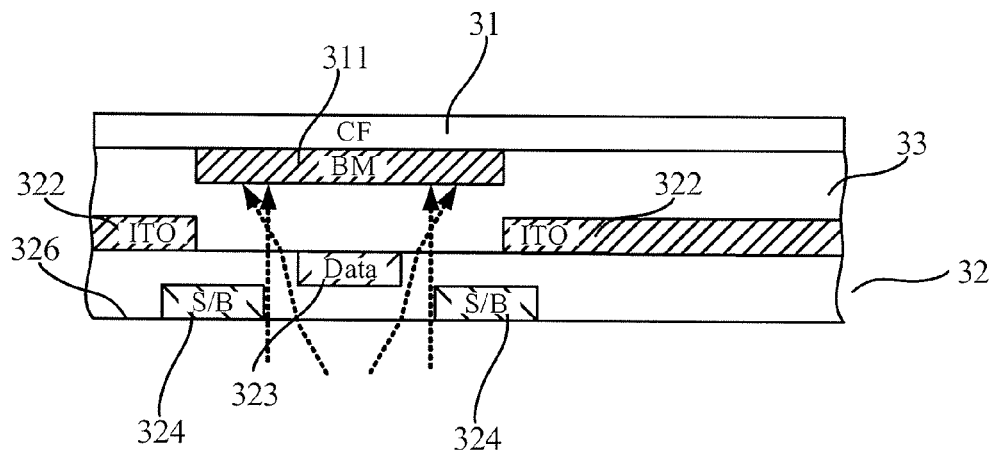
FIG. 3 is a cross-sectional view showing a liquid crystal panel in a conventional liquid crystal display.
Figure 4:
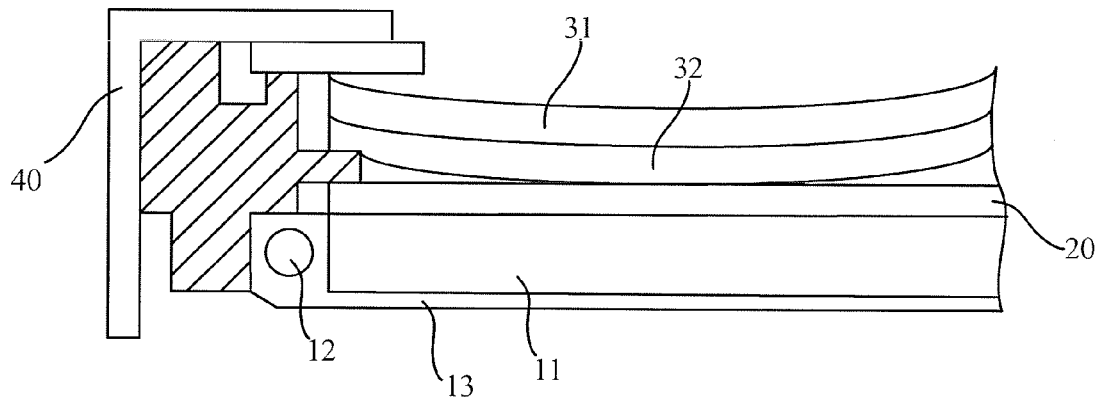
FIG. 4 is a schematic diagram showing a conventional liquid crystal panel in a bent state by an external force.
Figure 5:
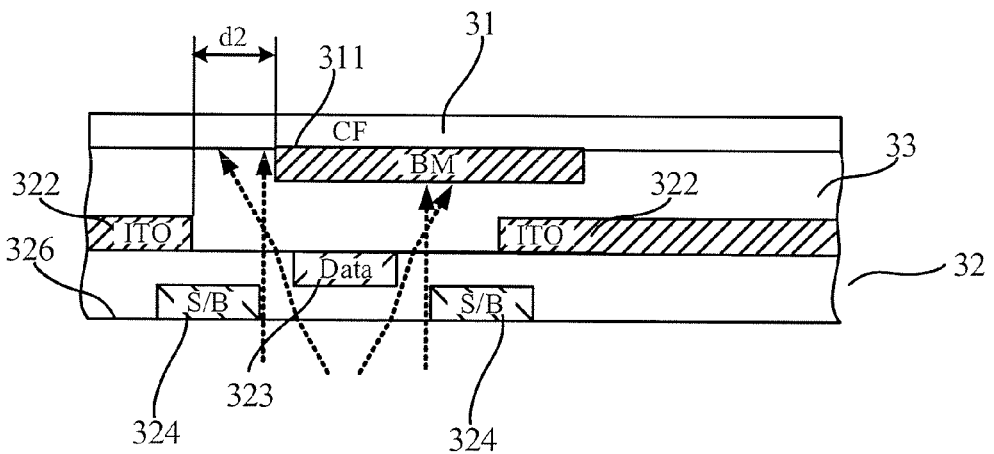
FIG. 5 is a cross-sectional view showing a structure of the conventional liquid crystal panel in a bent state.
Figure 6:
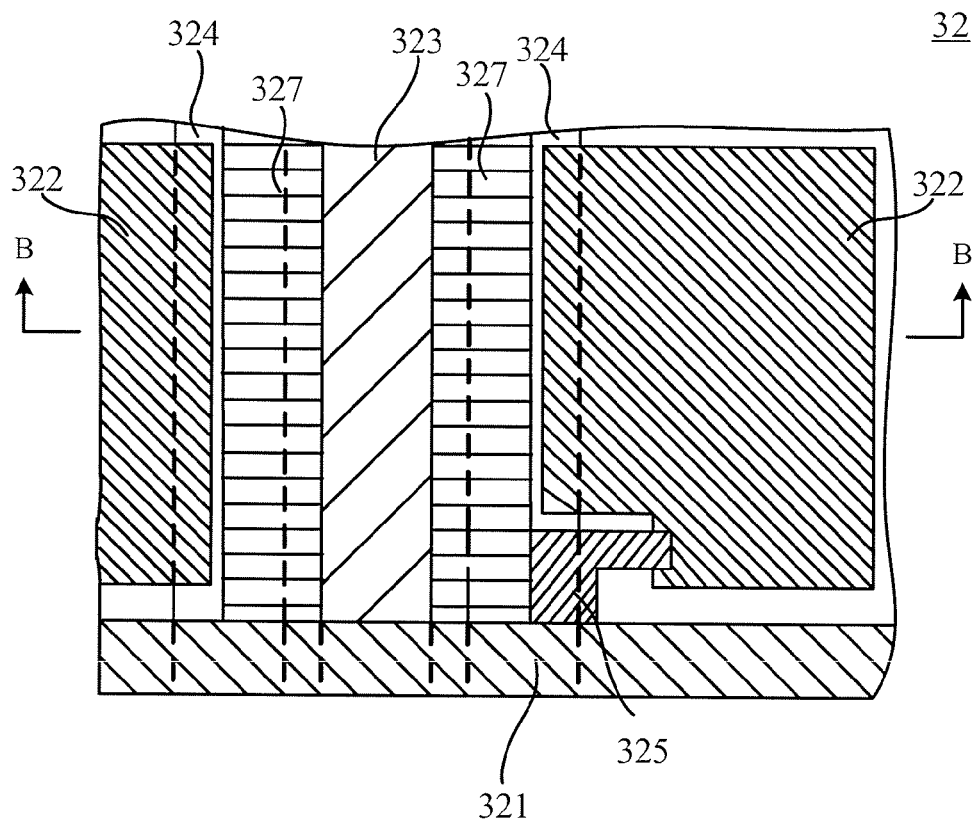
FIG. 6 is a structural top view showing an array substrate according to a first embodiment of the present invention.
Figure 7:
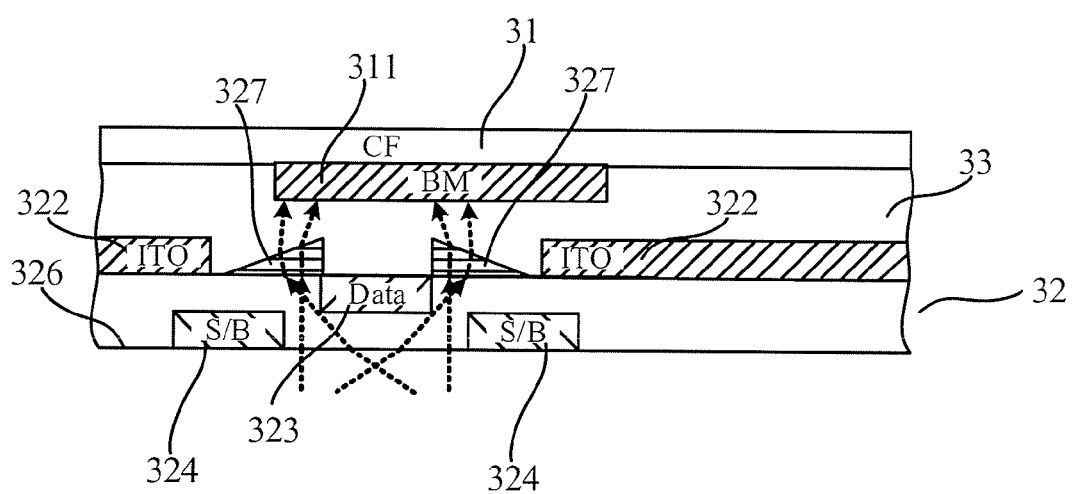
FIG. 7 is a cross-sectional view showing a liquid crystal panel comprising the array substrate according to the first embodiment of the present invention.

FIG. 6 is a structural top view showing an array substrate 32 according to a first embodiment of the present invention; and FIG. 7 is a cross-sectional view taken along line B-B of FIG. 6. For clarity purpose, FIG. 7 further shows a color filter substrate 31 provided above the array substrate 32, and in the shown state, the panel formed with the array substrate 32 and the color filter substrate 31 is slightly bent, and a black matrix on the color filter substrate 31 is shifted with respect to the array substrate 32 by a distance. A liquid crystal layer 33 is interposed between the array substrate 32 and the color filter substrate 31. The array substrate 32 of the present embodiment includes a base substrate 326 and a pixel electrode 322, a data line 323, light-blocking strips 324, a gate line 321, and a thin film transistor (TFT) switch elements 325 disposed on the base substrate 326 with an insulating layer being provided between the data line 323 and the light-blocking strips 324 to have them separated. The data line 323 is spaced from the pixel electrode 322 by a gap, and the light-blocking 324 is disposed under the gape for light blocking. In the present embodiment, refractive strips 327 are provided at both sides of the data line 323, respectively, and over the gaps between the data line 323 and the light-blocking strips 324. The refractive strip 327 is formed on the same layer as the liquid crystal layer 322 and of a material such as a resin with a refractive index larger than that of the liquid crystal layer 33 or larger than both the refractive index of the liquid crystal layer 33 and that of the material of the base substrate 326. Each refractive strip 327 has a cross section shape of right-angled triangle with a right-angle side facing the data line 323, that is, the side having a bigger height of the cross section is disposed facing the data line, and the side having a smaller height is disposed facing the pixel electrode. Alternatively, the cross section of the refractive strip 327 may be of other equivalent shapes. The resin may be acryl resin having a refractive index of 1.5 or benzocyclobutene (BCB) resin having a refractive index 1.56.

Figure 8:
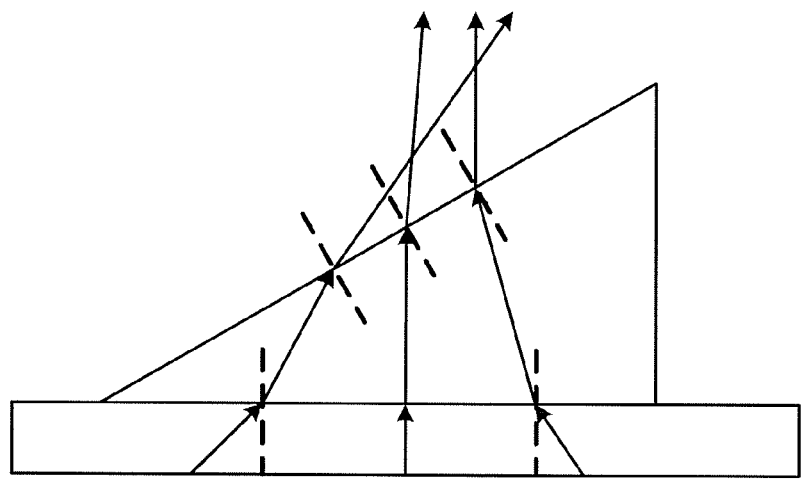
FIG. 8 is a diagram showing the optical principle.

In the present embodiment, during operation of the array substrate 32 comprising the refractive strip 327, light passing from the gap between the data line and the light-blocking strips changes its travel direction. From FIG. 7, light illuminated perpendicularly to the base substrate travels through the insulation layer in the base substrate and enters the refractive strip 327 without deflection due to the incident angle of approximate 90 degrees. Also, since the insulation layer has a small thickness, the deflection of light therein can be ignored, if any. When the light transmits from the refractive strip 327 into the liquid crystal layer 33, since the incident angle is an acute angle and the refractive index of the refractive strip 327 is larger than that of the liquid crystal layer 33, the light is deflected away from the normal direction, that is, towards the data line 323. According to knowledge in optics, as shown in FIG. 8, when light is refracted by an optical material, if the optical material has a refractive index larger than that of the surroundings, the light is deflected away from the normal line at the interface, and in the embodiment is deflected towards a side that has a bigger height in section. Specifically, in this embodiment, the light deflection by refraction mainly occurs on the inclined interface between the refractive strip and the liquid crystal layer, and in case that the refractive index of the refractive strip is larger than that of the liquid crystal, the desired deflection of the light can be obtained. Also, if the refractive index of the refractive strips is larger than both that of the liquid crystal and that of the base substrate, the result of light concentration is more preferable.

In the present embodiment, the travel direction of the light can be changed by provision of the refractive strip. When the panel is bent by an external force, although the black matrix shifts by a certain distance, the light passing through the shift region is substantially reduced since the light is deflected towards the data line and is blocked, thereby reducing the leakage light. The touch mura effect observed by a user can be reduced accordingly, and the display quality can be improved. Meanwhile, as compared with the conventional method of increasing area of the black matrix, in the present embodiment the aperture ratio of the liquid crystal display is not reduced, and transmissivity or brightness thereof is not disadvantageously affected.

Figure 9:
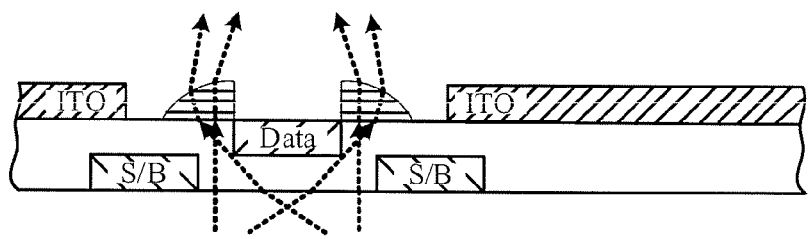
FIG. 9 is a cross-sectional view of an example of a refractive strip in the array substrate according to the first embodiment of the invention.
Figure 10:
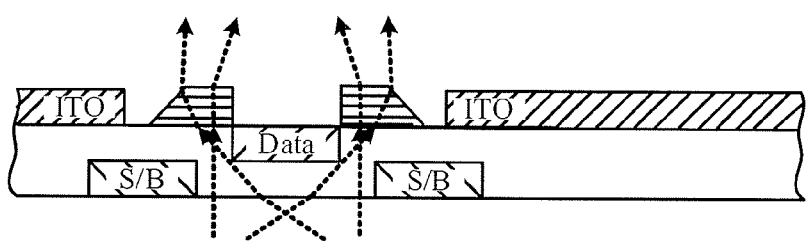
FIG. 10 is a cross-sectional view of another example of the refractive strip in the array substrate according to the first embodiment of the invention.
Figure 11:
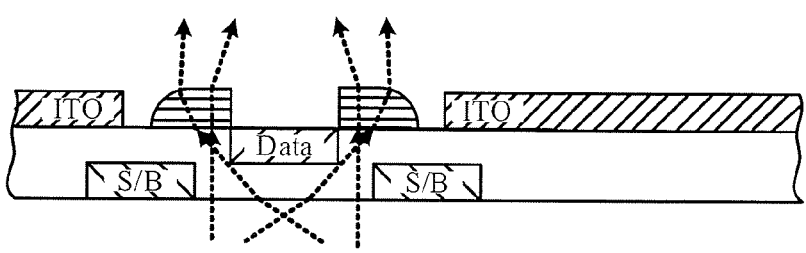
FIG. 11 is a cross-sectional view of still another example of the refractive strip in the array substrate according to the first embodiment of the invention.

According to the optical principle, the sectional shape of the refractive strip is not limited to a right-angled triangle. For example, the sectional shape may be other shapes such as a taper shape, a right-angled sector, a right-angled trapezoid, a right-angled trapezoid-like shape with a rounded angle, as shown in FIG. 9-11. Further, it is not necessary for the refractive strip to have a sectional shape with a right angle, so long as the height of the cross-sectional shape of the strips gradually varies, and the side having a bigger height is disposed to face the data line, and the side having a smaller height is disposed to face the pixel electrode. For example, the refractive strip may employ a taper shape with a sharp end opposite to the data line and a relatively wider end facing the data line.

In the figures, a data line is described as an example of a signal line in combination with the light-blocking strips, but a gate line suffers from the same problem in connection with the leakage light, thus the same configuration of the refractive strips applies to a gate line. Moreover, although two taper shape refractive strips are shown in the figures, the wider ends of the taper shape refractive strips can abut against each other or can be integrally formed so as to have a cross-sectional shape of a convex lens.

A second embodiment of an array substrate according to the invention is described in the following.

Figure 12:
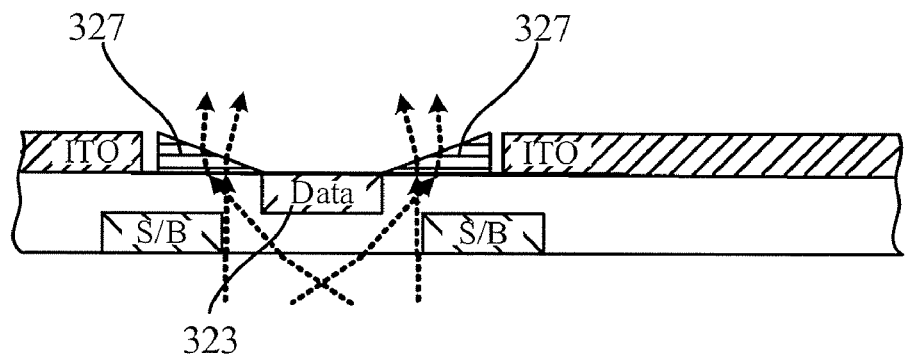
FIG. 12 is a schematic structural view showing an array substrate according to a second embodiment of the present invention.

FIG. 12 is a schematic structural view showing an array substrate according to a second embodiment of the present invention. The array substrate of the second embodiment has a structure substantially the same as that of the first embodiment except that a right-angle side of the right-angled triangle section of the refractive strips 327 is disposed opposite to the data line 323, that is, the side having a bigger height is disposed facing the pixel electrode and the side having a smaller height is disposed facing the data line, and the refractive strip 327 is made of a material having a refractive index lower than that of the liquid crystal layer or lower than both that of the liquid crystal layer and that of the base substrate.

The operation principle of the array substrate according to the second embodiment is substantially the same as that of the first embodiment. When light comes out from a inclined side of the right-angled triangle, the light is deflected towards the normal line, that is, towards the data line, due to relationship of refractive index between the refractive strip and the surroundings. Thus, the leakage light can be reduced. Specifically, in this embodiment, the light deflection by refraction mainly occurs on the inclined interface between the refractive strip and the liquid crystal layer, and in case that the refractive index of the refractive strip is lower than that of the liquid crystal, the desired deflection of the light can be obtained. Also, if the refractive index of the refractive strips is lower than both that of the liquid crystal and that of the base substrate, the result of light concentration is more preferable.

Similarly, the sectional shape of the refractive strip includes but not limited to a taper shape, a right-angled triangle, a right-angled sector, a right-angled trapezoid, a right-angled trapezoid-like shape, and the like, so long as the side having a bigger height of the refractive strip in section is disposed facing the pixel electrode and the side having a smaller height is disposed facing the data line. For example, the refractive strip may employ a taper shape with a sharp end facing the data line and a relatively wider end opposite to the data line. The refractive strips 327 may be made of a material having a refractive index lower than that of the base substrate, that is, lower than the refractive index of glass, and lower than that of the liquid crystal layer, such as polytetrafluoroethylene (PTEE) having a refractive index of 1.35, tetrafluoroethylene-hexafluoropropylene copolymer (FEP) having a refractive index of 1.338, fluorophenyalanine (FPA) having a refractive index of 1.35, and other fluoro resins having a refractive index as lower as about 1.3.

In the figures, a data line is described as an example of a signal line in combination with the light-blocking strips, but a gate line suffers from the same problem, thus the same configuration of the refractive strips applies to a gate line. Also, the two refractive strips can abut against each other or be formed integrally to form a cross section of a concave lens.

An embodiment of a liquid crystal display is described below.

Figure 13:
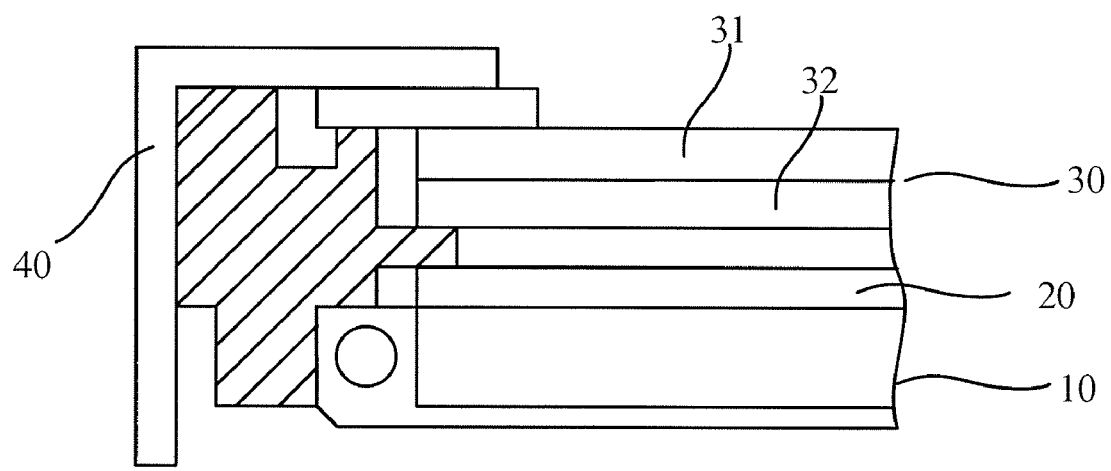
FIG. 13 is a schematic structural view showing a liquid crystal display according to an embodiment of the present invention.

FIG. 13 is a schematic structural view showing a liquid crystal display according to an embodiment of the present invention. The liquid crystal display comprises a backlight unit 10, an optical film 20, a liquid crystal panel 30 and an outer frame 40. The liquid crystal panel 30 is formed by attaching a color filter (CF) substrate 31 to an array substrate 32 with a liquid crystal layer (not shown) therebetween. The array substrate 32 may be one described above according to the embodiments of the present invention. For sake of convenience, FIG. 13 does not show the detailed structure of the array substrate. The liquid crystal display of the present invention can reduce light leaking from a shift region of the black matrix when the panel is bent by an external force, thus reducing the touch mura effect caused by the leakage light and improving the display quality.

The invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. An array substrate adapted for use with a liquid crystal layer, comprising:
   a base substrate; and
   a pixel electrode, a signal line, and a light-blocking strip that are provided on the base substrate,
   wherein the light-blocking strip is disposed below and at a side of the signal line and is separated from the signal line by the base substrate, a refractive strip is disposed at the side of the signal line over a gap between the light-blocking strip and the signal line, and the refractive strip is disposed on the same layer as the pixel electrode, and
   wherein the refractive strip deflects light transmitting therethrough from the base substrate side into the liquid crystal layer towards the signal line.

2. The array substrate of claim 1, wherein the refractive strip has a cross section with a side having a smaller height facing the pixel electrode and a side having a bigger height facing the signal line, and the refractive strip has a refractive index larger than that of the liquid crystal layer.

3. The array substrate of claim 2, wherein the refractive strip is made of a resin.

4. The array substrate of claim 2, wherein the refractive strip has a cross section that is selected from the group consisting of a taper shape, a right-angled triangle shape, a right-angled sector shape, a right-angled trapezoid shape and a right-angled trapezoid-like shape.

5. The array substrate of claim 2, wherein the signal line is selected from the group consisting of a data line and a gate line.

6. The array substrate of claim 1, wherein the refractive strip has a cross section with a side having a smaller height facing the signal line and a side having a bigger height facing the pixel electrode, and the refractive strip has a refractive index lower than that of the liquid crystal layer.

7. The array substrate of claim 6, wherein the refractive strip is made of a material selected from the group consisting of polytetrafluoroethylene, tetrafluoroethylene-hexafluoropropylene copolymer, and fluorophenyalanine.

8. The array substrate of claim 6, wherein the refractive strip has a cross section that is selected from the group consisting of a taper shape, a right-angled triangle shape, a right-angled sector shape, a right-angled trapezoid shape and a right-angled trapezoid-like shape.

9. The array substrate of claim 6, wherein the signal line is selected from the group consisting of a data line and a gate line.

10. A liquid crystal display comprising a liquid crystal panel that is formed by attaching a color filter substrate to an array substrate with a liquid crystal layer therebetween, the array substrate comprising:
- a base substrate; and
- a pixel electrode, a signal line, and a light-blocking strip that are provided on the base substrate,
- wherein the light-blocking strip is disposed below and at a side of the signal line and is separated from the signal line by the base substrate, a refractive strip is disposed at the side of the signal line over a gap between the light-blocking strip and the signal line, and the refractive strip is disposed on the same layer as the pixel electrode, and
- wherein the refractive strip deflects light transmitting therethrough from the base substrate side into the liquid crystal layer towards the signal line.

11. The liquid crystal display of claim 10, wherein the refractive strip has a cross section with a side having a smaller height facing the pixel electrode and a side having a bigger height facing the signal line, and the refractive strip has a refractive index larger than that of the liquid crystal layer.

12. The liquid crystal display of claim 11, wherein the refractive strip is made of a resin.

13. The liquid crystal display of claim 11, wherein the refractive strip has a cross section that is selected from the group consisting of a taper shape, a right-angled triangle shape, a right-angled sector shape, a right-angled trapezoid shape and a right-angled trapezoid-like shape.

14. The liquid crystal display of claim 11, wherein the signal line is selected from the group consisting of a data line and a gate line.

15. The liquid crystal display of claim 11, wherein the color filter substrate comprises a black matrix that is provided corresponding to the signal line.

16. The liquid crystal display of claim 10, wherein the refractive strip has a cross section with a side having a smaller height facing the signal line and a side having a bigger height facing the pixel electrode, and the refractive strip has a refractive index lower than that of the liquid crystal layer.

17. The liquid crystal display of claim 16, wherein the refractive strip is made of a material selected from the group consisting of polytetrafluoroethylene, tetrafluoroethylene-hexafluoropropylene copolymer, and fluorophenyalanine.

18. The liquid crystal display of claim 16, wherein the refractive strip has a cross section that is selected from the group consisting of a taper shape, a right-angled triangle shape, a right-angled sector shape, a right-angled trapezoid shape and a right-angled trapezoid-like shape.

19. The array substrate of claim 16, wherein the signal line is selected from the group consisting of a data line and a gate line.

20. The liquid crystal display of claim 16, wherein the color filter substrate comprises a black matrix that is provided corresponding to the signal line.

* * * * *